March 18, 1947.  R. R. ANDERSON  2,417,463
APPARATUS FOR COMPARTMENT HEATING
Filed Nov. 14, 1944
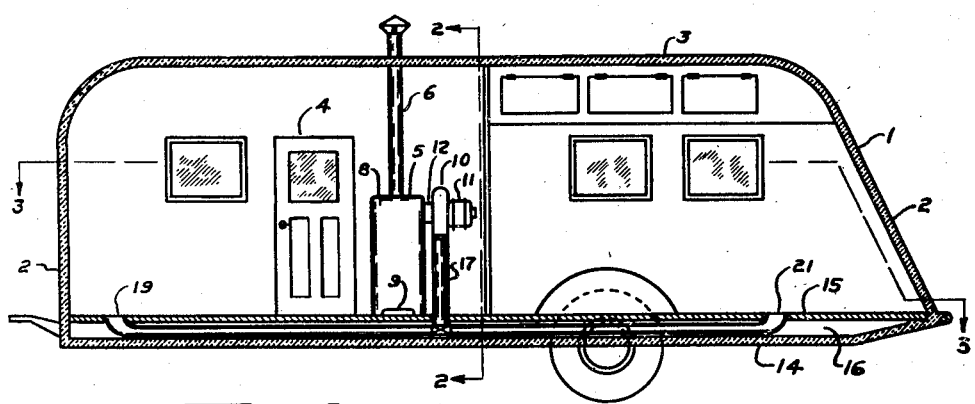
Fig-I
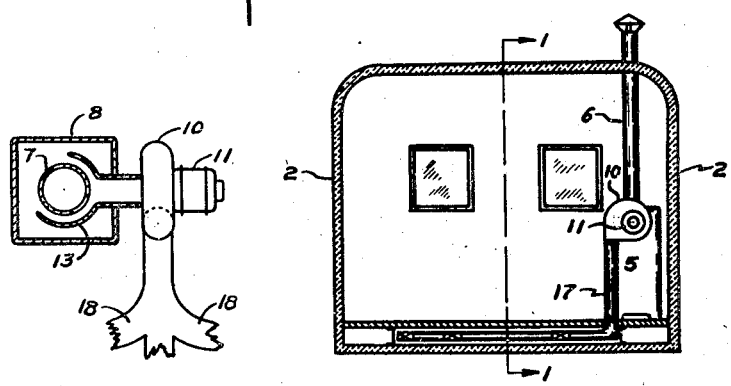
Fig-IV   Fig-II
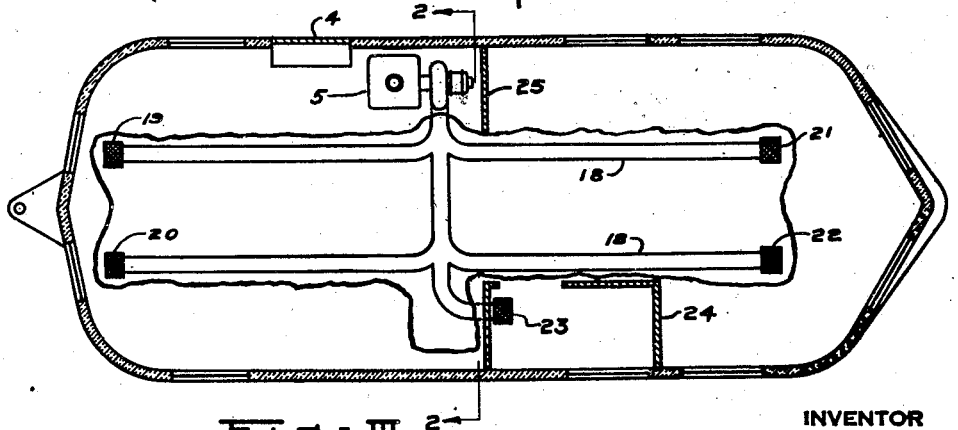
Fig-III
INVENTOR
Rex R. Anderson
BY Roy A. Plant
ATTORNEY Patented Mar. 18, 1947

2,417,463

UNITED STATES PATENT OFFICE 2,417,463

APPARATUS FOR COMPARTMENT HEATING

Rex R. Anderson, Marshall, Mich.

Application November 14, 1944, Serial No. 563,371

4 Claims. (Cl. 237—43)

1

The present invention relates broadly to compartments having a special air treating and circulating system, and in its specific phases to a house trailer with a hollow double floor, an air heater, and means including a circulating fan connected to ducts placed in said hollow double floor for taking air from the trailer interior, passing it through said heater and ducts, and then returning it to the trailer interior.

House trailers are rapidly being adopted for year round living quarters. Where such trailers of conventional construction are used in cold weather at temperatures below freezing, they present the well recognized disadvantage of stratified heated air in the trailer interior with an exceedingly cold floor. They have the further disadvantage of sweating walls and even the formation, in freezing weather of approximately 15° F. or below, of frost on the walls and floor at the ends of the trailer remote from the heating stove. I have discovered that such difficulties can be avoided by providing the house trailer with a hollow double floor through which air is circulated in either direction, and preferably in series from the passageway in the hollow double floor through the heating portion of the stove into the interior of the trailer compartment, and then back into said passageway in the hollow double floor through registers at the ends of the trailer. That invention is set forth in my Patent No. 2,225,244, issued December 17, 1940. A modification of that system is covered by my Patent No. 2,326,318, issued August 10, 1943, wherein there are two overlapping air flow circuits, one an air heating circuit and the other an air circulating circuit wherein air is delivered from the trailer interior through the hollow space of the double floor and back into the trailer interior. Both of those inventions involve relatively rapid air flow into the hollow space in the floor followed by a rather leisurely flow to the outlet therefrom. This permits dust and lint to settle in the hollow floor space where it is practically impossible to remove it, and also causes a fire hazard due to the dryness and inflammability of this deposited material. My present invention has been devised to improve and to provide a new combination which overcomes this shortcoming of my above referred to inventions, while maintaining the general advantages of same.

Accordingly among the objects of the present invention is the provision of an improved heating system, and method of heating a house trailer or compartment having the under face of its floor exposed to relatively wide temperature variations.

2

Another object is to provide a heating system for house trailers or the like which have a hollow double floor, wherein higher temperature air can be more safely circulated between the top and bottom panels of the floor.

Another object is to provide a house trailer, having a hollow floor, with a duct system placed in the hollow floor, said duct system being connected at one end to a heating system and at the other to the interior of the house trailer, whereby heat radiated from the ducts warms at least part of the space adjacent the ducts in said hollow floor and facilitates heating a major portion of the exposed upper face of the floor.

A further object is to provide a non-inflammable duct system in a hollow floor wherein there is an outlet and an inlet to the duct system connecting the space above said floor, said duct system being constructed so that an accumulation of lint and dust therein is substantially eliminated.

A further object is to provide a house trailer heating system utilizing a hollow floor with non-inflammable ducts therein having an inlet and an outlet connecting the house trailer interior, and adapted for forced circulation heating of various rooms wherein means for controlling the proportionate heating is provided.

Still further objects will appear as the description proceeds.

To the accomplishment of the foregoing and related ends, the invention, then, consists of the methods and means hereinafter described and particularly pointed out in the claims, the annexed drawing and the following description setting forth in detail certain means and modes of carrying out the invention, such disclosed means and modes illustrating, however, but one of various ways in which the principle of the invention may be used.

In said annexed drawing:

Figure 1 shows a sectional elevation of a house trailer embodying in diagrammatic manner certain features of the present invention, as viewed along line 1—1 of Figure 2.

Figure 2 is a sectional elevation view as taken along line 2—2 of Figure 1.

Figure 3 is a sectional plan view of a house trailer embodying in diagrammatic manner certain features of the present invention, as viewed along line 3—3 of Figure 1, with a portion of the upper floor broken away to show a preferred form of duct system.

Figure 4 shows a fragmentary sectional view through a modified heating stove with connecting ducts.

For simplicity of understanding the present invention, it has been diagrammatically shown in connection with a house trailer devoid of interior fittings and equipment aside from the heater. Referring more particularly to the drawing, Figure 1 shows a house trailer 1 having insulated side and end walls 2, and an insulated roof 3. Ingress and egress from the trailer is had in conventional manner by means of door 4.

Due to the cold air which flows into the trailer when the door is opened in cold weather, it is common practice to mount the stove 5 at one side of the doorway. For simplicity of showing the present invention, this standard construction is illustrated, although it is to be understood that the invention is not limited to the placing of the stove in this specific location. Various types of stove construction may be utilized, and in each case it is provided with a chimney 6 for carrying the products of combustion out of the trailer. The stove moreover has a fire pot 7 mounted within a suitable housing 8. Where this housing is of the conventional closed upper end construction, it may be provided with an inlet 9 for air to be heated and circulated, and such inlet is preferably loacted near the floor. In that case air is drawn by suction fan 10, driven by small electric motor 11, into housing 8 through inlet 9 from whence it flows around fire pot 7, and out of outlet connection 12 to and through fan 10 and the connected duct work.

Where the heating stove 5 is of the construction having a bottom air inlet with conventional louvers for outlet of heated air at the top of the stove, these upper louvered openings may be either closed so that the only outlet for heated air is through the fan, or these louvered openings may be left open, in which case a baffle 13, Figure 4, should be installed around fire pot 7 within housing 8 so that fan 10 will draw air directly over the surface of fire pot 7 and thus insure adequate heating of same without short circuiting.

The present invention deals specifically with a hollow floor construction house trailer or portable structure. This hollow floor is provided with a well insulated bottom panel 14 and a top floor 15 with hollow space 16 therebetween. Mounted in this hollow space 16, and connected to exhaust outlet duct 17 from fan 10, is a tubular duct system 18. At the ends of these ducts are mounted registers 19, 20, 21, 22, and 23. These registers are preferably of adjustable type permitting same to be regulated from open to shut with various gradations therebetween. This permits concentrated delivery of heated air to any particular point desired. For instance, partition 24, Figure 3, with conventional door (not shown) may be used to form a small wash or shower bath room. If it is desired to have extra heat in this room during the taking of a shower bath, register 23 may be fully open while registers 19, 20, 21, and 22 may be partially or wholly closed. It is becoming common practice to install cross partitions 25 in order to separate the interior of the house trailer, or portable builidng, into two or more rooms. In such cases it may be desirable to take advantage of the adjustable registers to force more heated air to one room than the other, and particularly so where one of the rooms is used for sleeping purposes.

The tubular ducts 18, which lead from the fan to the outlet registers, may be of round or other cross section depending upon the particular construction of the hollow floor and the thickness of space 16 therein. These ducts are preferably made of sheet metal in conventional manner. The forcing of heated air through these ducts largely prevents the accumulation therein of dust and lint, and thus eliminates the fire hazard which is inherent in the older constructions wherein air was either drawn or forced through the hollow space as a whole without metal duct work for carrying same. These ducts become heated from carrying the hot air, and radiate heat into the hollow space 16, thus warming the upper floor 15 in the unobstructed area containing the ducts. It is common practice to have a davenport or a bed at one or both ends of the trailer, with corresponding normal restriction of air flow thereunder. The present invention makes possible the placing of registers under the davenport or bed so as to eliminate the air circulation restriction, and avoid dead air pockets wherein sweating and even frosting can take place when the assembly is used for living purposes during freezing weather.

The size of the ducts 18, and the temperature of the air being forced through same by means of fan 10, will considerably vary the amount of heat which will be radiated in space 16. Where the heat radiated is excessive it may tend to make the floor too warm and in order to overcome this situation duct 18 may be partially or wholly insulated, and particularly along the upper face of the duct which is adjacent the top panel of the floor. The showing of the duct work in the drawing is intended to be considered as diagrammatically illustrating ducts with or without insulation.

Other modes of applying the principle of my invention may be employed instead of that explained, change being made as regards the means and methods herein disclosed, provided those stated by any of the following claims or their equivalent be employed.

I therefore particularly point out and distinctly claim as my invention:

1. An apparatus of the character described, which comprises a house trailer with a compartment normally closed to the atmosphere and having a double floor with an insulated bottom wall and with a wide but relatively shallow air space therebetween extending under a major portion of the floor area, a heating means in said compartment, a tubular duct system in the shallow air space of the double floor, said tubular duct system extending substantially to both ends of said compartment, outlets from the ends of said duct system into said compartment, and means for forcing air through said compartment, heating means and duct system in series in a substantially closed circuit, whereby air is circulated in said compartment from the duct outlets to the heating means and the floor over said shallow air space is warmed by heat radiated therefrom from said duct system.

2. An apparatus of the character described, which comprises a house trailer with a compartment and having a double floor with a wide but relatively shallow and substantially closed air space therebetween extending under a major portion of the floor area, insulation on the under face of said double floor, a heating means within said compartment, a tubular duct system in the shallow air space of said double floor, outlets from said tubular duct system into said compartment, and means for circulating air in a substantially closed circuit through said heating means, tubular duct system, and trailer compartment in series, a large portion of the upper face of said double floor being warmed by heat radiated therein from said duct system.

3. A house trailer or the like which has insulated side and end walls, an insulated roof, an externally exposed double floor the top and bottom portions of which are of tight construction with a relatively shallow air passageway therebetween extending under a large portion of the exposed upper face of same, insulation on the under face of said double floor, a tubular duct system in the shallow air space of said double floor, said tubular duct system extending substantially to both ends of said house trailer, outlets connecting the ends of said duct system to the house trailer interior, a heating means within said house trailer, and an electric fan for drawing air from the house trailer interior through said heating means and forcing it through said tubular duct system and back into said house trailer interior in a substantially closed circuit, whereby the temperature within the house trailer is kept relatively uniform from end to end and the upper floor over said shallow air space in the double floor is warmed by heat radiated therein from said duct system.

4. A house trailer or the like which has insulated side and end walls, an insulated roof, an externally exposed double floor the top and bottom portions of which are of tight construction with a relatively shallow air passageway therebetween extending under a large portion of the exposed upper face of same, insulation on the under face of said double floor, a tubular duct system in the shallow air space of said double floor, said tubular duct system extending substantially to both ends of said house trailer, insulation at least on the upper face of said tubular duct system, adjustable registers connecting the ends of said duct system to the house trailer interior, a heating stove within said house trailer, said heating stove having a fire pot, a housing with air inlet, and an air baffle around the fire pot, and an electric fan for drawing air from the house trailer interior into said stove housing and through same between said baffle and fire pot and out through said duct system back into the house trailer interior in a substantially closed circuit, whereby the temperature within the house trailer is kept relatively uniform from end to end and the upper floor over said shallow air space in the double floor warmed by heat radiated therein from said duct system.

REX R. ANDERSON.

REFERENCES CITED

The following references are of record in the file of this patent:

UNITED STATES PATENTS

| Number | Name | Date |
| --- | --- | --- |
| 2,195,691 | Burt | Apr. 2, 1940 |
| 2,273,176 | Burt | Feb. 17, 1942 |
| 1,995,481 | Myers | Mar. 26, 1935 |
| 485,036 | Healy | Oct. 25, 1892 |